US008810484B2

(12) United States Patent
Kim

(10) Patent No.: US 8,810,484 B2
(45) Date of Patent: Aug. 19, 2014

(54) ORGANIC LIGHT EMITTING DISPLAY

(75) Inventor: Min-Cheol Kim, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 239 days.

(21) Appl. No.: 13/244,246

(22) Filed: Sep. 23, 2011

(65) Prior Publication Data

US 2012/0169574 A1 Jul. 5, 2012

(30) Foreign Application Priority Data

Jan. 5, 2011 (KR) ........................ 10-2011-0000888

(51) Int. Cl.
*G09G 3/30* (2006.01)
*G09G 3/36* (2006.01)
*G06F 3/038* (2013.01)
*G09G 5/00* (2006.01)

(52) U.S. Cl.
USPC .............................. 345/76; 345/100; 345/205

(58) Field of Classification Search
None
See application file for complete search history.

(56) References Cited

U.S. PATENT DOCUMENTS

2004/0189583 A1* 9/2004 Park et al. ..................... 345/100
2006/0007072 A1* 1/2006 Choi et al. ...................... 345/76
2007/0075937 A1* 4/2007 Kim ................................ 345/76
2008/0111804 A1* 5/2008 Choi et al. .................... 345/205
2008/0238897 A1* 10/2008 Kimura ......................... 345/204

FOREIGN PATENT DOCUMENTS

KR 10-2002-0090313 A 12/2002
KR 10-2006-0104851 A 10/2006
KR 10-2009-0072784 A 7/2009

* cited by examiner

*Primary Examiner* — Alexander Eisen
*Assistant Examiner* — Nan-Ying Yang
(74) *Attorney, Agent, or Firm* — Christie, Parker & Hale, LLP

(57) ABSTRACT

An organic light emitting display includes pixels at crossing regions of scan lines, data lines, and emission control lines, a display unit including the pixels and divided into at least i blocks, wherein i is a natural number greater than 1, each of the blocks including corresponding scan lines, scan drivers each coupled to a corresponding one of the blocks for supplying scan signals to the corresponding scan lines, emission drivers included in the blocks for supplying emission control signals to the emission control lines, each of the blocks includes corresponding emission control lines, a data driver for supplying data signals to the data lines, a timing controller for controlling the scan drivers, the emission drivers, and the data driver and for supplying emission block control signals to control light emission of the pixels, wherein the pixels are set in a non-emissive state when receiving the emission block control signal.

14 Claims, 6 Drawing Sheets

ORGANIC LIGHT EMITTING DISPLAY

CROSS-REFERENCE TO RELATED APPLICATION

This application claims priority to and the benefit of Korean Patent Application No. 10-2011-0000888, filed on Jan. 5, 2011, in the Korean Intellectual Property Office, the entire content of which is incorporated herein by reference.

BACKGROUND

1. Field

Embodiments of the present invention relate to an organic light emitting display.

2. Description of the Related Art

Recently, various flat panel displays (FPDs) capable of reducing weight and volume, which are disadvantages of cathode ray tubes (CRTs), have been developed. The types of FPDs include liquid crystal displays (LCDs), field emission displays (FEDs), plasma display panels (PDPs), and organic light emitting displays.

Among the FPDs, the organic light emitting displays display images using organic light emitting diodes (OLEDs) that generate light by the re-combination of electrons and holes. The organic light emitting display has high response speed and is driven with low power consumption.

The organic light emitting display includes a plurality of pixels arranged at crossing regions of a plurality of data lines, scan lines, and power source lines in a matrix. Generally, each of the pixels includes an organic light emitting diode (OLED), at least two transistors including a driving transistor, and at least one capacitor.

When the FPD is driven, a method of performing impulsive driving such as black data insertion (BDI) is provided in the middle of (e.g., during) a frame to improve the picture quality of a moving picture. Therefore, in some FPDs, black data is supplied to the pixels and black is displayed in accordance with the supplied black data.

However, generally, when black data and a scan signal corresponding to the black data are supplied in order to display black, power consumption is not reduced. In addition, generally, when a black image is inserted using black data, a desired black image is not displayed due to leakage current (e.g., the FPD may still emit light due to leakage current).

SUMMARY

Accordingly, embodiments of the present invention have been made to provide an organic light emitting display capable of reducing power consumption.

According to one embodiment of the present invention, an organic light emitting display includes a display unit comprising a plurality of pixels at crossing regions of a plurality of scan lines, a plurality of data lines, and a plurality of emission control lines, the display unit being divided into at least i blocks, wherein i is a natural number greater than 1, each of the blocks comprising a plurality of corresponding scan lines of the scan lines, a plurality of i scan drivers each coupled to a corresponding one of the blocks for supplying a plurality of scan signals to the corresponding scan lines, a plurality of emission drivers included in the blocks for supplying a plurality of emission control signals to the emission control lines, each of the blocks comprising a plurality of corresponding emission control lines of the emission control lines, a data driver for supplying a plurality of data signals to the data lines, and a timing controller for controlling the scan drivers, the emission drivers, and the data driver and for supplying a plurality of emission block control signals to control light emission of the pixels, wherein the pixels in a same one of the blocks are configured to receive a same one of the emission block control signals and wherein the pixels are configured to be set in a non-emission state when the pixels receive a corresponding one of the emission block control signals.

The timing controller may be configured to stop the supply of the data signals and the scan signals to a block of the blocks which is set in the non-emission state. The organic light emitting display may further include a plurality of first switching elements between a plurality of corresponding first scan stages of the scan drivers and a start signal transmission line. The timing controller may be further configured to supply a plurality of scan control signals to the first switching elements at different times and the first switching elements may be configured to be turned on by the scan control signals. The timing controller may be configured to supply i start signals during one frame period and the timing controller may be configured to supply i−1 scan control signals are supplied to overlap i−1 of the i start signals. In one embodiment, the scan control signals do not overlap with one another.

Each of the scan control signals may overlap a corresponding start signal of the start signals and the timing controller may be configured to stop supplying the scan control signals corresponding to a first start signal of the start signals before supplying a second start signal of the start signals after the first start signal is supplied. A scan control signal may be supplied to a first switching element of the first switching elements in a kth (k is a natural number) block does not overlap an emission block control signal of the emission control signals supplied to the kth block. Each of the emission block control signals may have a width larger than a width of each of the scan control signals. Each of the scan drivers may be configured to sequentially supply scan signals to the scan lines of the scan lines coupled thereto in accordance with receiving a start signal of a plurality of start signals. The display unit may be divided into at least four even blocks and at least two blocks of the at least four even blocks may be configured to receive the same emission block control signal and the same scan control signal.

Each of the pixels may include an organic light emitting diode (OLED), a pixel circuit coupled to a data line of the data lines and a scan line of the scan lines to control an amount of current supplied to the OLED, a first transistor coupled between the pixel circuit and the OLED and configured to be turned off when an emission block control signal of the emission block control signals is supplied, and a second transistor coupled between a first power source and the pixel circuit and having a gate electrode coupled to an emission control line of the emission control lines. Each of the pixels may further include a third transistor coupled between a gate electrode of the second transistor and the emission control line and configured to be turned off when the emission block control signal is supplied. The organic light emitting display may further include a plurality of third transistors coupled between a corresponding one of the emission control lines and a corresponding one of the emission drivers and configured to be turned off when the emission block control signal is supplied.

In the organic light emitting display according to embodiments of the present invention, a panel is divided into a plurality of blocks and the pixels included in the block are simultaneously turned off so that a black image may be inserted. In particular, according to embodiments of the present invention, because a scan signal and a data signal are not supplied to a block that displays the black image, a driving frequency may be reduced and, at the same time, power consumption may be reduced.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
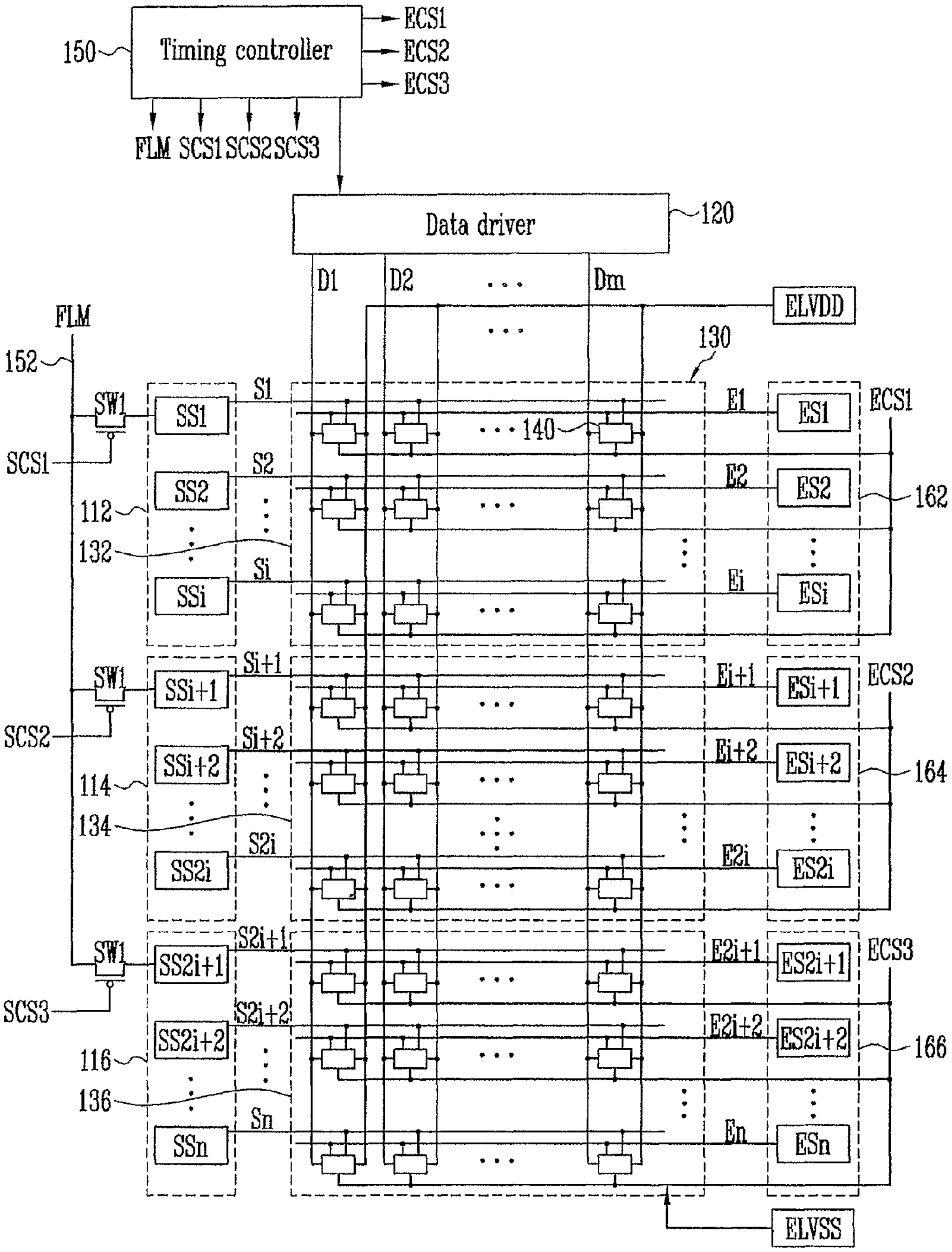
FIG. 1 is a circuit diagram of an organic light emitting display according to an embodiment of the present invention.

Hereinafter, certain exemplary embodiments according to the present invention will be described with reference to the accompanying drawings. Here, when a first element is described as being coupled to a second element, the first element may be not only directly coupled to the second element but may also be indirectly coupled to the second element via a third element. Further, some of the elements that are not essential to the complete understanding of the invention are omitted for clarity. Also, like reference numerals refer to like elements throughout.

Hereinafter, exemplary embodiments of the present invention, by which those who skilled in the art may easily perform the present invention, will be described in detail with reference to FIGS. 1, 2, 3, 4, and 5.

FIG. 1 is a circuit diagram of an organic light emitting display according to an embodiment of the present invention.

Referring to FIG. 1, the organic light emitting display includes a display unit 130 divided into a plurality of blocks 132, 134, and 136, pixels 140 arranged in the display unit 130 in a matrix format, scan drivers 112, 114, and 116 for driving scan lines S1 to Sn coupled to the pixels 140, emission drivers 162, 164, and 166 for driving emission control lines E1 to En coupled to the pixels 140, a data driver 120 for driving data lines D1 to Dm coupled to the pixels 140, and a timing controller 150 for controlling the drivers 112, 114, 116, 120, 162, 164, and 166.

The display unit 130 includes the pixels 140 arranged in a matrix. The display unit 130 is divided into the plurality of blocks 132, 134, and 136. Each of the blocks 132, 134, and 136 includes at least two scan lines. In FIG. 1, for convenience sake, the display unit 130 (or a panel) is divided into the three blocks 132, 134, and 136. However, the present invention is not limited to the above. Actually, the display unit 130 may be divided into at least two blocks.

The pixels 140 are located at the crossing regions of the scan lines S1 to Sn, the data lines D1 to Dm, and the emission control lines E1 to En. The pixels 140 in a row are selected when a scan signal is supplied to a corresponding scan line (one of S1 to Sn) to receive a data signal from the data lines D1 to Dm. In the pixels 140, emission time is controlled in accordance with an emission control signal supplied to an emission control line (one of E1 to En).

The pixels included in the same blocks 132, 134, and 136 receive the same emission block control signals ECS1, ECS2, and ECS3. The emission block control signals ECS1, ECS2, and ECS3 are used as signals for controlling the emission of the pixels 140 by blocks. That is, when the first emission block control signal ECS1 is supplied, the pixels 140 included in the first block 132 are set in a non-emission state (that is, black). When the second emission block control signal ECS2 is supplied, the pixels 140 included in the second block 134 are set in a non-emission state. When the third emission block control signal ECS3 is supplied, the pixels 140 included in the third block 136 are set in a non-emission state.

The emission block control signals ECS1, ECS2, and ECS3 are used for inserting a black image in units of the blocks 132, 134, and 136. That is, according to embodiments of the present invention, a black image is inserted using the emission block control signals ECS1, ECS2, and ECS3 without supplying an additional black data signal so that power consumption may be reduced. In addition, because the black data signal is not supplied, scan signals are not supplied to the blocks 132, 134, and 136 that receive the emission block control signal (one of ECS1, ECS2, and ECS3). Therefore, the driving frequencies of the scan driver 112, 114, and 116 may be reduced.

The scan drivers 112, 114, and 116 are formed in the blocks 132, 134, and 136, respectively, and scan signals are supplied to scan lines coupled thereto. That is, in one embodiment, the first scan driver 112 sequentially supplies scan signals to the scan lines S1 to Si included in the first block 132, the second scan driver 114 sequentially supplies scan signals to the scan lines Si+1 to S2*i* included in the second block 134, and the third scan driver 116 sequentially supplies scan signals to scan lines S2*i*+1 to Sn included in the third block 136.

Therefore, the scan drivers 112, 114, and 116 include i (i is a natural number) stages SS1 to SSi, SSi+1 to SS2*i*, and SS2*i*+1 to Sn, respectively. Each of the stages (one of SS1 to Sn) receives a scan signal of a previous stage or a start signal FLM and generates a scan signal in accordance with the received scan signal of the previous stage or the start signal FLM. According to one embodiment of the present invention, the stages SS1 to SSn are formed in a panel. In this case, the stages SS1 to SSn may be freely constituted in accordance with the number of scan lines included in the blocks 132, 134, and 136.

First switching elements SW1 are formed between the first stages SS1, SSi+1, and SS2*i*+1 of the scan drivers 112, 114, and 116 and a transmission line 152. The transmission line 152 for supplying the start signal FLM is coupled to the timing controller 150. The first switching elements SW1 are turned on when a scan control signal (e.g., one of SCS1, SCS2, and SCS3) is supplied from the timing controller 150 and is turned off in the other cases (e.g., when the scan control signal is not supplied).

When a particular first switching element SW1 is turned on, the start signal FLM is supplied to the first stage (e.g., one of SS1, SSi+1, and SS2*i*+1) coupled to the particular first switching element SW1 so that scan signals are sequentially supplied from a scan driver (one of 112, 114, and 116) including the first stages SS1, SSi+1, and SS2*i*+1. When the particular first switching element SW1 is turned off, the start signal FLM is not supplied to the corresponding first stage (e.g., one of SS1, SSi+1, and SS2*i*+1) coupled to the particular first switching element SW1 so that the scan signals are not supplied from the corresponding scan driver (e.g., one of 112, 114, and 116) including the first stages SS1, SSi+1, and SS2*i*+1.

In one embodiment, the data driver 120 supplies data signals to the data lines D1 to Dm in synchronization with the scan signals supplied to the scan lines S1 to Sn. In particular, the data driver 120 does not supply the data signals to a block (one of 162, 164, and 166) to which the scan signals are not supplied, that is, the block (one of 162, 164, and 166) that displays a black image (e.g., in a passive matrix display).

In one embodiment, the first emission driver 162 supplies emission control signals to the emission control lines E1 to Ei formed in the first block 132. Therefore, the first emission driver 162 includes emission stages ES1 to ESi coupled to the emission control lines E1 to Ei.

In one embodiment, the second emission driver 164 supplies emission control signals to the emission control lines Ei+1 to E2*i* formed in the second block 134. Therefore, the second emission driver 164 includes emission stages ESi+1 to ES2*i* coupled to the emission control lines Ei+1 to E2*i*.

In one embodiment, the third emission driver 166 supplies emission control signals to emission control lines E2*i*+1 to En formed in the third block 136. Therefore, the third emission driver 166 includes the emission stages E2*i*+1 to En coupled to the emission control lines E2*i*+1 to En.

According to some embodiments of the present invention, emission stages ES1 to ESn are directly formed in a panel. In this case, the stages ES1 to ESn may be freely constituted in accordance with the number of emission control lines included in the blocks 132, 134, and 136.

According to one embodiment of the present invention, the timing controller 150 supplies the start signal FLM to the scan drivers 112, 114, and 116 and supplies the scan control signals SCSI, SCS2, and SCS3 to the first switching elements SW1. In addition, the timing controller 150 supplies the block control signals ECS1, ECS2, and ECS3 to the blocks 132, 134, and 136. Additionally, the timing controller 150 controls the data driver 120 and the emission drivers 162, 164, and 166.

Figure 2:
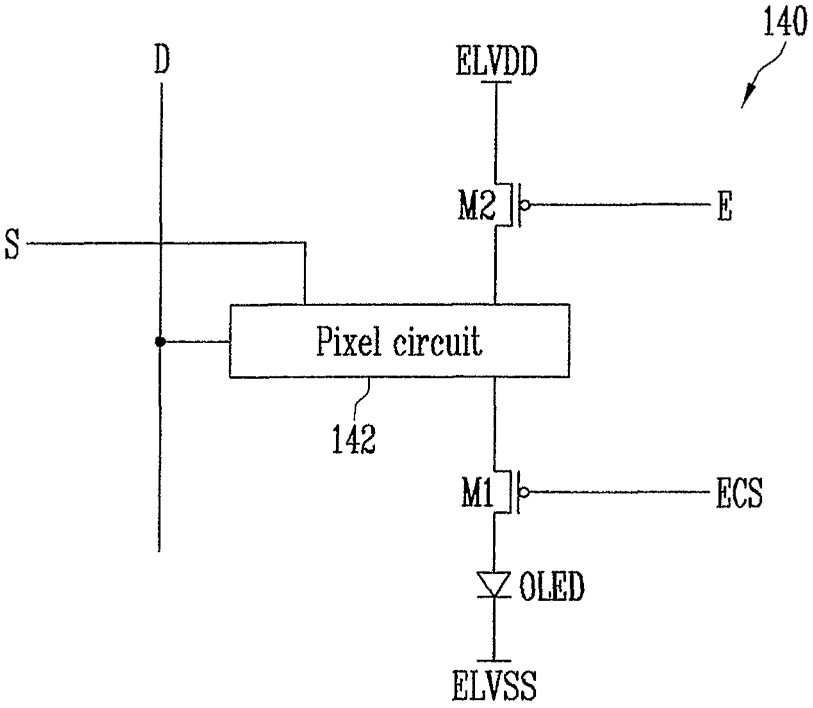
FIG. 2 is a circuit diagram of a pixel of FIG. 1 according to one embodiment of the present invention.

FIG. 2 is a view illustrating a pixel of FIG. 1 according to one embodiment of the present invention.

Referring to FIG. 2, the pixel 140 according to one embodiment of the present invention includes an organic light emitting diode (OLED), a pixel circuit 142 for controlling the amount of current supplied to the OLED, a second transistor M2 coupled between the pixel circuit 142 and a first power source ELVDD, and a first transistor M1 coupled between the pixel circuit 142 and the OLED.

The pixel circuit 142 includes a plurality of transistors and a capacitor. The pixel circuit 142 receives the data signals from the data lines D to store the received data signals in the capacitor when the scan signals are supplied to the scan lines S. Then, the pixel circuit 142 controls the amount of current that flows from the first power source ELVDD to a second power source ELVSS via the OLED in accordance with the voltage stored in the capacitor. The pixel circuit 142 may be realized by currently well-known various types of circuits.

The anode electrode of the OLED is coupled to the pixel circuit 142 and the cathode electrode of the OLED is coupled to the second power source ELVSS. The OLED generates light with brightness (e.g., a predetermined brightness) in accordance with the amount of current supplied from the pixel circuit 142.

The first electrode of the second transistor M2 is coupled to the first power source ELVDD and the second electrode of the second transistor M2 is coupled to the pixel circuit 142. The gate electrode of the second transistor M2 is coupled to an emission control line E. The second transistor M2 is turned on and off in accordance with the emission control signal supplied from the emission control line E.

The first electrode of the first transistor M1 is coupled to the pixel circuit 142 and the second electrode of the first transistor M1 is coupled to the OLED. The first transistor M1 is turned off when an emission block control signal (one of ECS1, ECS2, and ECS3) is supplied and is turned on when an emission block control signal (one of ECS1, ECS2, and ECS3) is supplied.

Here, each first transistor M1 included in the same block (e.g., one of 132, 134, and 136) receives the same emission block control signal (one of ECS1, ECS2, and ECS3). Therefore, when the first emission block control signal ECS1 is supplied, all of the first transistors M1 included in the first block 132 are set in a turned off state so that the first block 132 is set in a non-emission state. When the second emission block control signal ECS2 is supplied, the second block 134 is set in a non-emission state. When the third emission block control signal ECS3 is supplied, the third block 136 is set in the non-emission state.

Figure 3:
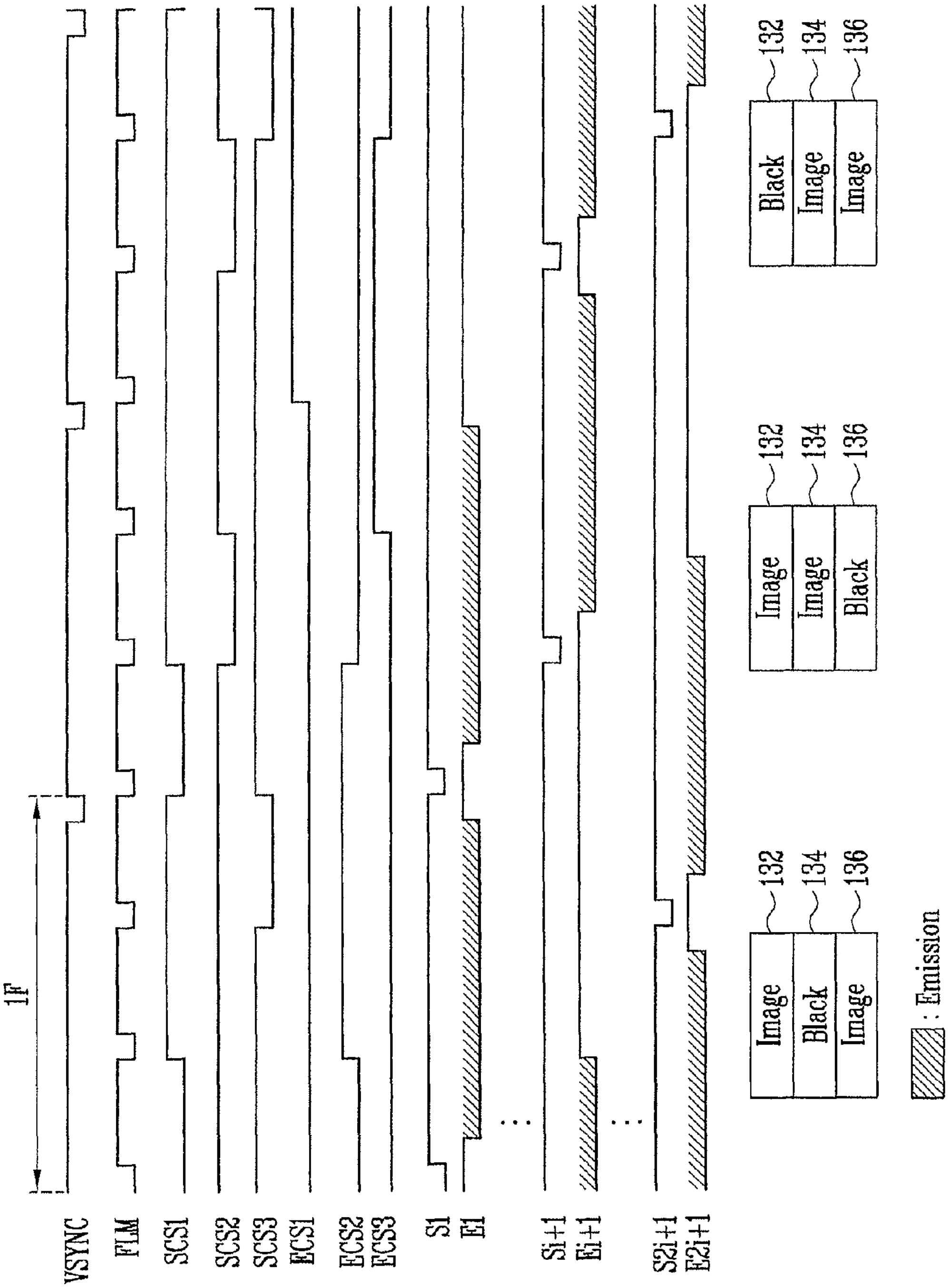
FIG. 3 is a waveform diagram illustrating a method of driving the organic light emitting display according to one embodiment of the present invention.

FIG. 3 is a waveform diagram illustrating a method of driving the organic light emitting display according to one embodiment of the present invention.

Referring to FIG. 3, three start signals FLM and two scan control signals SCS are supplied during one frame period.

That is, when the display unit 130 is divided into k (k is a natural number no less than 2) blocks, i (where i is a natural number) start signals FLM are supplied and (i−1) scan control signals SCS are supplied in one frame 1F period (in the embodiment shown in FIG. 3, the start signals FLM and the scan control signals SCS are depicted as logic low signals). Here, each of the (i−1) scan control signals SCS is supplied to overlap one of the i start signals FLM. The scan control signal SCS that overlaps a specific start signal FLM is supplied until the next start signal FLM is supplied. Therefore, the scan control signal SCS1 has a larger width than the start signal FLM.

The emission block control signal ECS supplied to a kth (where k is a natural number) block does not overlap the scan control signal supplied to the first switching element SW1 positioned in a kth block (in the embodiment shown in FIG. 3, the emission block control signal ECS is depicted as logic high signal). That is, the first emission block control signal ECS1 does not overlap the first scan control signal SCS1 and is supplied in a frame period where the first scan control signal SCS1 is not supplied (e.g., as shown in the embodiment of FIG. 3, the first emission block signal is supplied during the third frame period). The first emission block control signal ECS1 is set to have a larger width than the first scan control signal SCS1.

The second emission block control signal ECS2 does not overlap the second scan control signal SCS2 and is supplied in a frame period where the second scan control signal SCS2 is not supplied. The third emission block control signal ECS3 does not overlap the third scan control signal SCS3 and is supplied in a frame period where the third scan control signal SCS3 is not supplied.

Operation processes according to one embodiment of the present invention will be described as follows. First, the first scan control signal SCS1 is supplied in a specific frame period and a first start signal FLM is supplied. While the first scan control signal SCS1 is supplied, the first switching element SW1 coupled to the first scan driver 112 is turned on. While the first switching element SW1 is turned on, the start signal FLM is supplied to the first scan stage SS1 so that the scan signals are sequentially supplied to the scan lines S1 to Si. At this time, the emission control signals are supplied (e.g., as depicted in FIG. 3 as a logic high signal) to the emission control lines E1 to Ei to overlap the scan signals supplied to the scan lines S1 to Si.

Then, a third start signal FLM is supplied and the third scan control signal SCS3 is supplied. While the third scan control signal SCS3 is supplied, the first switching element SW1 coupled to the third scan driver 116 is turned on. While the first switching element SW1 is turned on, the start signal FLM is supplied to the first scan stage SS2*i*+1 so that the scan signals are sequentially supplied to the scan lines S2*i*+1 to Sn. At this time, the emission control signals are supplied to the emission control lines E2*i*+1 to En to overlap the scan signals supplied to the scan lines S2*i*+1 to 2*n*.

During a period where the first block 132 and the third block 136 emit light, the second emission block control signal ECS2 is supplied. In this case, the pixels 140 included in the second block 134 display a black image.

In a next frame period (e.g., a following frame period), the first scan control signal SCS1 is supplied and the first start signal FLM is supplied so that the pixels included in the first block 132 emit light. Then, the second scan control signal SCS2 is supplied in synchronization with the second start signal FLM so that the pixels included in the second block 134 emit light. On the other hand, in a period where the pixels included in the first block 132 and the second block 134 emit light, the third emission block control signal ECS3 is supplied so that the third block 136 is set in the non-emission state.

Then, the second scan control signal SCS2 is supplied in synchronization with the second start signal FLM in the next frame period (e.g., a following frame period) so that the pixels included in the second block 134 emit light. Then, the third scan control signal SCS3 is supplied in synchronization with the third start signal FLM so that the pixels included in the third block 136 emit light. On the other hand, in a period where the pixels included in the second block 134 and the third block 136 emit light, the first emission block control signal ECS1 is supplied so that the first block 132 is set in the non-emission state.

As described above, according to one embodiment of the present invention, when k blocks are included (e.g., included in the display unit), k−1 scan control signals SCS are supplied during each frame. The emission black control signals ECS are supplied to the specific block that does not receive the scan control signals SCS during the frame to display a black image. Here, because the block that displays black is controlled by the emission block control signals ECS regardless of black data, power consumption may be reduced. In addition, because the current supplied to the OLED is blocked when black is displayed, a desired black image may be displayed regardless of leakage current. Because the scan signals and the data signals are not supplied to the block that displays black, a driving frequency may be reduced and power consumption may be additionally reduced.

Figure 6:
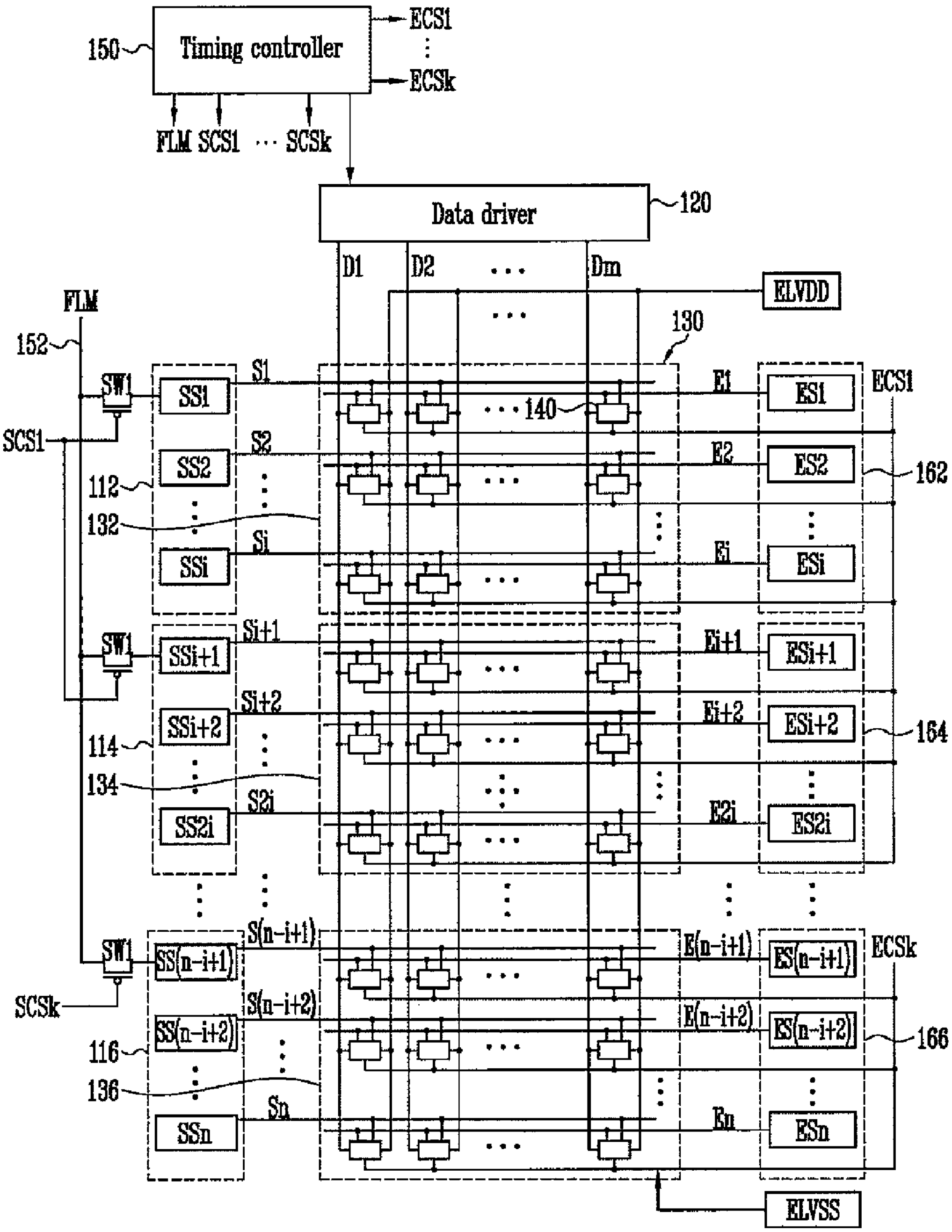
FIG. 6 is a circuit diagram of an organic light emitting display according to an embodiment of the present invention.

According to the embodiment described above, the display unit 130 is divided into three blocks (e.g., k=3). However, embodiments of the present invention are not limited to the above. For example, the display unit 130 may be divided into at least four even number of blocks or another suitable number of blocks. When the display unit 130 is divided into the at least four even number of blocks (or other suitable number of blocks), at least two blocks may share a scan control signal and an emission block control signal. For example, FIG. 6 illustrates the display unit 130 being divided into k blocks (wherein k is an even number greater than 3). In this example, the first and second blocks share a same control signal and a same emission block control signal.

Figure 4:
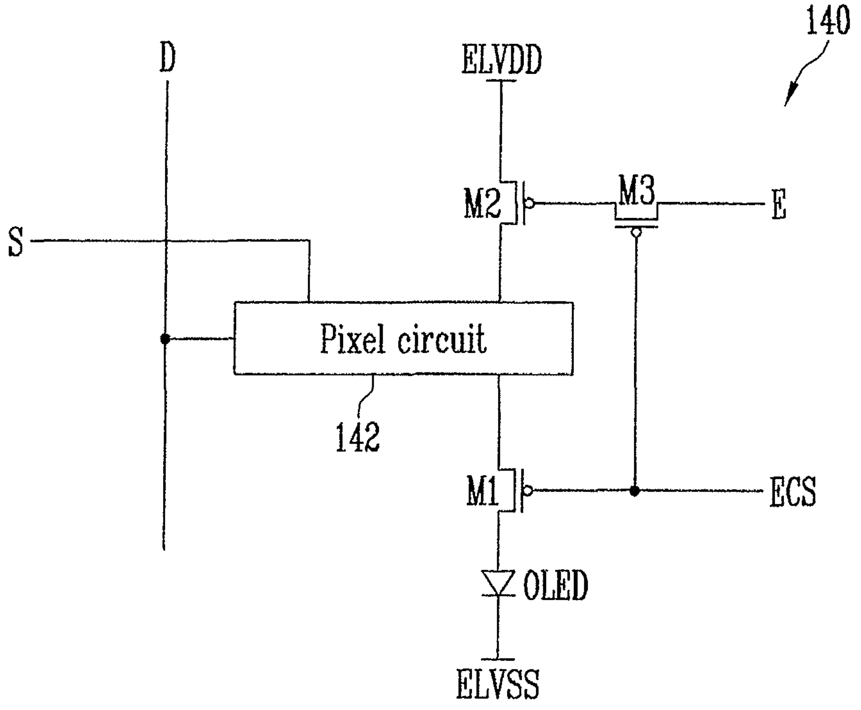
FIG. 4 is a circuit diagram of a pixel of FIG. 1 according to one embodiment of the present invention.

FIG. 4 is a view illustrating a second embodiment of the pixel of FIG. 1. When FIG. 4 is described, elements that are substantially the same as those of FIG. 2 are denoted by the same reference numerals and detailed description thereof will be omitted.

Referring to FIG. 4, the pixel 140 according to the second embodiment of the present invention further includes a third transistor M3 positioned between the gate electrode of the second transistor M2 and the emission control line E.

The third transistor M3 is turned off when an emission block control signal is supplied and is turned on at other times. That is, the third transistor M3 is turned off when the emission block control signal is supplied such that the third transistor M3 blocks coupling between the emission control line E and the gate electrode of the second transistor M2.

Figure 5:
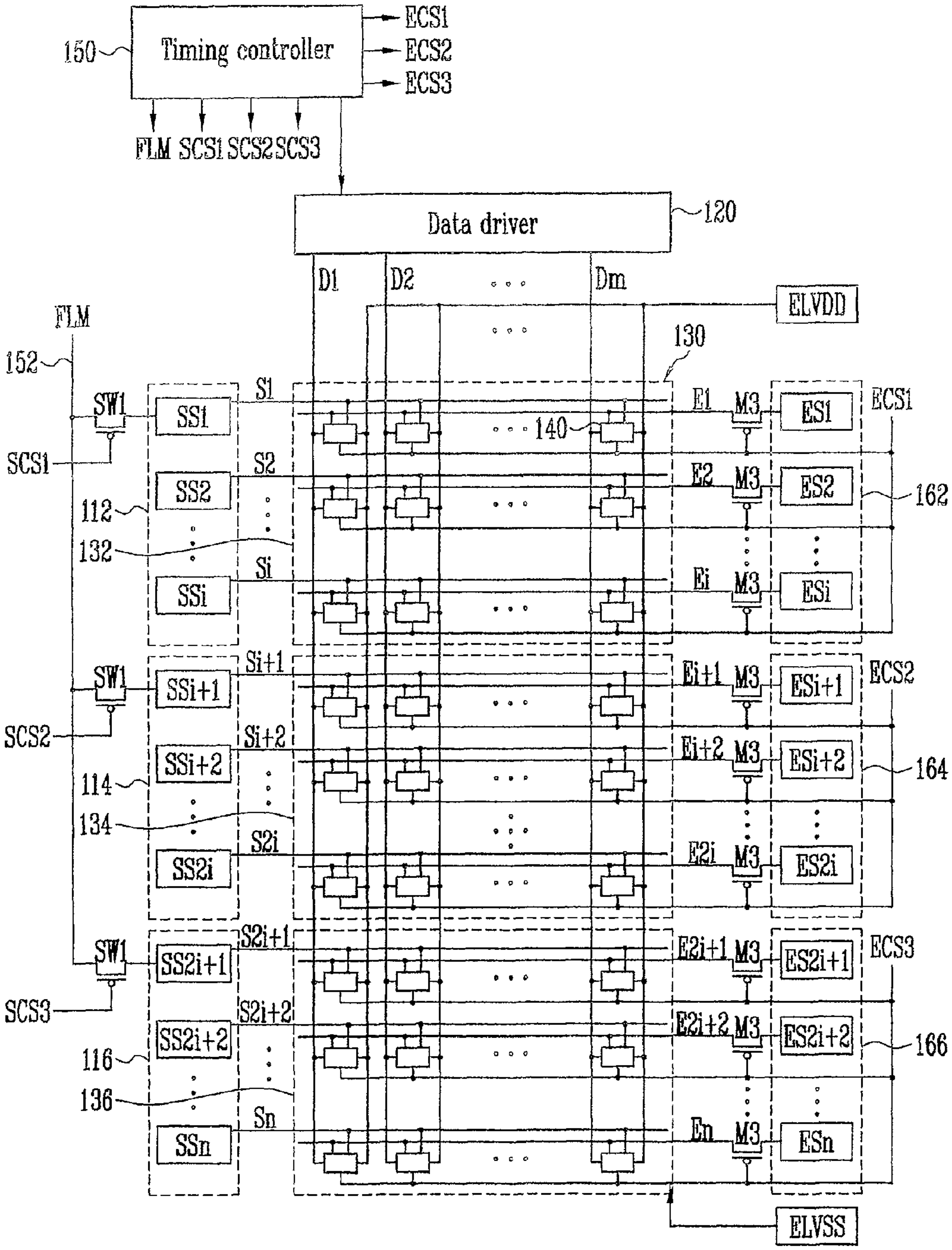
FIG. 5 is a circuit diagram of an organic light emitting display according to 10 another embodiment of the present invention.

In the embodiment shown in FIG. 4, the third transistor M3 is included in each of the pixels 140. However, embodiments of the present invention are not limited to the above. For example, the third transistor M3 may be formed between each of the emission control lines E1 to En and the emission stages ES1 to ESn as illustrated in FIG. 5. The third transistor M3 may be driven in accordance with the emission block control signal (one of ECS1 to ECS3) supplied to the block (one of 132, 134, and 136) including the third transistor M3.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An organic light emitting display comprising:

a display unit comprising a plurality of pixels at crossing regions of a plurality of scan lines, a plurality of data lines, and a plurality of emission control lines, the display unit being divided into at least k blocks, wherein k is a natural number greater than 1, each of the blocks comprising a plurality of corresponding scan lines of the scan lines;

a plurality of k scan drivers each coupled to a corresponding one of the blocks for supplying a plurality of scan signals to the corresponding scan lines;

a plurality of emission drivers included in the blocks for supplying a plurality of emission control signals to the emission control lines, each of the blocks comprising a plurality of corresponding emission control lines of the emission control lines;

a data driver for supplying a plurality of data signals to the data lines; and a timing controller for controlling the scan drivers, the emission drivers, and the data driver, for supplying a plurality of start signals, for supplying a plurality of scan control signals, and for supplying a plurality of emission block control signals to control light emission of the pixels, wherein the pixels in a same one of the blocks are configured to receive a same one of the emission block control signals, wherein the pixels are configured to be set in a non-emission state when the pixels receive a corresponding one of the emission block control signals, and wherein a first scan driver of the scan drivers is controlled by a first scan control signal of the scan control signals, and a second scan driver of the scan drivers is controlled by a second scan control signal of the scan control signals, the first scan control signal being different from the second scan control signal, wherein each of the scan control signals overlaps a corresponding start signal of the plurality of start signals.

2. The organic light emitting display as claimed in claim 1, wherein the timing controller is configured to stop the supply of the data signals and the scan signals to a block of the blocks which is set in the non-emission state.

3. The organic light emitting display as claimed in claim 1, further comprising a plurality of first switching elements between a plurality of corresponding first scan stages of the scan drivers and a start signal transmission line.

4. The organic light emitting display as claimed in claim 3, wherein the timing controller is further configured to supply the plurality of scan control signals to the first switching elements and to supply each of the plurality of scan control signals at different times, and wherein the first switching elements are configured to be turned on by the scan control signals.

5. The organic light emitting display as claimed in claim 4, wherein the timing controller is configured to supply k start signals of the plurality of start signals during one frame period, and wherein the timing controller is configured to supply k−1 scan control signals to overlap k−1 of the k start signals.

6. The organic light emitting display as claimed in claim 5, wherein the scan control signals do not overlap with one another.

7. The organic light emitting display as claimed in claim 5, wherein the timing controller is configured to stop supplying one of the scan control signals corresponding to a first start signal of the start signals before supplying a second start signal of the start signals after the first start signal is supplied.

8. The organic light emitting display as claimed in claim 5, wherein a scan control signal of the scan control signals is supplied to a first switching element of the first switching elements in a jth (j is a natural number) block does not overlap an emission block control signal of the emission control signals supplied to the jth block.

9. The organic light emitting display as claimed in claim 5, wherein each of the emission block control signals has a width larger than a width of each of the scan control signals.

10. The organic light emitting display as claimed in claim 4, wherein each of the scan drivers is configured to sequentially supply scan signals to the scan lines of the scan lines coupled thereto in accordance with receiving a start signal of a plurality of start signals.

11. An organic light emitting display comprising:

a display unit comprising a plurality of pixels at crossing regions of a plurality of scan lines, a plurality of data lines, and a plurality of emission control lines, the display unit being divided into at least k blocks, wherein k is a natural number greater than 1, each of the blocks comprising a plurality of corresponding scan lines of the scan lines;

a plurality of k scan drivers each coupled to a corresponding one of the blocks for supplying a plurality of scan signals to the corresponding scan lines;

a plurality of emission drivers included in the blocks for supplying a plurality of emission control signals to the emission control lines, each of the blocks comprising a plurality of corresponding emission control lines of the emission control lines;

a data driver for supplying a plurality of data signals to the data lines; and a timing controller for controlling the scan drivers, the emission drivers, and the data driver, and for supplying a plurality of emission block control signals to control light emission of the pixels, wherein the pixels in a same one of the blocks are configured to receive a same one of the emission block control signals, wherein the pixels are configured to be set in a non-emission state when the pixels receive a corresponding one of the emission block control signals, wherein the timing controller is further configured to supply a plurality of scan control signals to a plurality of first switching elements at different times, wherein the first switching elements are configured to be turned on by the scan control signals, wherein the display unit is divided into at least four even blocks, and wherein at least two blocks of the at least four even blocks are configured to receive the same emission block control signal and the same scan control signal.

12. The organic light emitting display as claimed in claim 1, wherein each of the pixels comprises:

an organic light emitting diode (OLED);

a pixel circuit coupled to a data line of the data lines and a scan line of the scan lines to control an amount of current supplied to the OLED;

a first transistor coupled between the pixel circuit and the OLED and configured to be turned off when an emission block control signal of the emission block control signals is supplied; and a second transistor coupled between a first power source and the pixel circuit and having a gate electrode coupled to an emission control line of the emission control lines.

13. An organic light emitting display comprising:

a display unit comprising a plurality of pixels at crossing regions of a plurality of scan lines, a plurality of data lines, and a plurality of emission control lines, the display unit being divided into at least k blocks, wherein k is a natural number greater than 1, each of the blocks comprising a plurality of corresponding scan lines of the scan lines;

a plurality of k scan drivers each coupled to a corresponding one of the blocks for supplying a plurality of scan signals to the corresponding scan lines;

a plurality of emission drivers included in the blocks for supplying a plurality of emission control signals to the emission control lines, each of the blocks comprising a plurality of corresponding emission control lines of the emission control lines;

a data driver for supplying a plurality of data signals to the data lines; and a timing controller for controlling the scan drivers, the emission drivers, and the data driver, and for supplying a plurality of emission block control signals to control light emission of the pixels, wherein the pixels in a same one of the blocks are configured to receive a same one of the emission block control signals, wherein the pixels are configured to be set in a non-emission state when the pixels receive a corresponding one of the emission block control signals, and wherein each of the pixels comprises:

an organic light emitting diode (OLED);

a pixel circuit coupled to a data line of the data lines and a scan line of the scan lines to control an amount of current supplied to the OLED;

a first transistor coupled between the pixel circuit and the OLED and configured to be turned off when an emission block control signal of the emission block control signals is supplied; and a second transistor coupled between a first power source and the pixel circuit and having a gate electrode coupled to an emission control line of the emission control lines, and a third transistor coupled between a gate electrode of the second transistor and the emission control line and configured to be turned off when the emission block control signal is supplied.

14. The organic light emitting display as claimed in claim 12, further comprising a plurality of third transistors coupled between a corresponding one of the emission control lines and a corresponding one of the emission drivers and configured to be turned off when the emission block control signal is supplied.

* * * * *